(12) United States Patent
Gramme

(10) Patent No.: US 7,559,975 B2
(45) Date of Patent: Jul. 14, 2009

(54) PROCESS FOR TRANSFORMING GAS/LIQUID FLOW INTO LAMINAR OR STRATIFIED FLOW

(75) Inventor: Per Gramme, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 12/153,005

(22) Filed: May 12, 2008

(65) Prior Publication Data

US 2008/0216656 A1  Sep. 11, 2008

Related U.S. Application Data

(62) Division of application No. 10/500,724, filed as application No. PCT/NO03/00029 on Jan. 31, 2003, now abandoned.

(30) Foreign Application Priority Data

Feb. 8, 2002  (NO)  .................................. 20020619

(51) Int. Cl.
*B01D 45/12* (2006.01)

(52) U.S. Cl. ................. 95/34; 55/416; 55/456; 55/457

(58) Field of Classification Search ................ 210/150, 210/151; 95/269; 55/416, 456, 457
See application file for complete search history.

(56) References Cited

U.S. PATENT DOCUMENTS

| | | | |
|---|---|---|---|
| 2,506,298 A | 5/1950 | Griffen | |
| 2,784,803 A | 3/1957 | Saxton | |
| 2,806,551 A | 9/1957 | Heinrich | |
| 3,258,895 A | 7/1966 | Wiebe et al. | |
| 3,788,282 A * | 1/1974 | Modrak et al. | 122/34 |
| 4,001,448 A | 1/1977 | Finucane et al. | |
| 4,098,582 A | 7/1978 | Takeda | |
| 4,131,439 A | 12/1978 | Holter | |
| 4,141,705 A * | 2/1979 | Campolong | 55/394 |
| 4,808,007 A | 2/1989 | King | |

(Continued)

FOREIGN PATENT DOCUMENTS

EP  0203896  12/1986

(Continued)

OTHER PUBLICATIONS

Choi et. al., A Study of Gas-Liquid Two-Phase Flow in a Horizontal Tube Under Microgravity,2002, Ann.N.Y. Acad. Sci. 974; 316-327 (2002).*

*Primary Examiner*—Duane Smith
*Assistant Examiner*—Sonji Turner
(74) *Attorney, Agent, or Firm*—Wenderoth, Lind & Ponack, L.L.P.

(57) ABSTRACT

A process in connection with a pipe (1) for transforming a dispersed gas/liquid flow into laminar stratified flow. The solution involves a first set of stationary guide blades (6) arranged in the pipe (1) and designed to rotate the liquid/gas flow. The pipe (1) is, in turn, connected to a second pipe (2) with the same or a different diameter and, in the transition between the pipe (1) and the second pipe (2), there is a second set of blades or a device (8) that is designed to stop the rotation of the gas. The natural flow pattern of the gas/liquid in the second pipe (2) then becomes stratified over a predefined distance.

8 Claims, 3 Drawing Sheets

U.S. PATENT DOCUMENTS

| | | | |
|---|---|---|---|
| 4,886,523 A * | 12/1989 | Maldague | 95/269 |
| 5,104,233 A * | 4/1992 | Kojima | 366/339 |
| 6,604,850 B1 * | 8/2003 | Schneider et al. | 366/175.2 |
| 7,163,626 B1 | 1/2007 | Cuypers et al. | |
| 2005/0150200 A1 | 7/2005 | Koene et al. | |

FOREIGN PATENT DOCUMENTS

| | | | |
|---|---|---|---|
| EP | 0210910 | | 2/1987 |
| GB | 1127514 | * | 5/1966 |
| GB | 1206007 | | 9/1970 |
| JP | 359051120 | | 3/1984 |
| WO | 03053590 | | 10/2003 |

* cited by examiner

PROCESS FOR TRANSFORMING GAS/LIQUID FLOW INTO LAMINAR OR STRATIFIED FLOW

This is a divisional application of Ser. No. 10/500,724, now abandoned which is the National Stage of International Application No. PCT/NO03/00029, filed Jan. 31, 2003.

BACKGROUND OF THE INVENTION

The present invention concerns a device in connection with pipes for the transformation of dispersed liquid/gas flow into laminar or stratified flow. More precisely, the present invention concerns a device that is designed to break down drops of liquid in a gas flow, in particular a gas flow in a pipe or a pipe separator.

In many situations in connection with the flow of gas in a pipe, there will also be drops of liquid dispersed in the gas flow. In particular in connection with the production of oil and gas or in installations for processing, for example the separation of oil and gas, there will be flow conditions in which large quantities of liquid exist as drops dispersed in the gas. For several reasons, it is desirable to break down the drops of liquid in such gas flows in order to achieve pure flows of gas/liquid.

The prior art contains the use of so-called drop traps for the separation of drops of liquid from a gas flow, but such drop traps consist of separate devices connected to the transport pipe and have external dimensions that extend far beyond the diameter of the transport pipe. Such a drop trap has a relatively expensive design and cannot be used in contexts in which there is a lack of space or where it is required that the diameter of the transport pipe for the gas/liquid transported cannot be exceeded by much.

The applicant having filed the present patent application has previously filed patent applications, including PCT/NO98/00085, concerning the separation of fluids in pipes or wells, for example sea bed and downhole separation of oil, water and gas. An essential precondition for achieving separation in a pipe or well is that the flow is stratified.

In connection with the extraction of oil and gas, there may be dispersed liquid/gas flow in many situations where downhole pipe separators are used.

SUMMARY OF THE INVENTION

With the present invention, a device has been produced that transforms dispersed liquid/gas flow into stratified flow in a simple fashion over a very short distance. The solution is very effective and inexpensive and can easily be adapted to pipe separators as described in the above application.

The present invention is characterised in that a first set of stationary guide blades is arranged in the transport pipe. The guide blades are designed to rotate the liquid/gas flow. The transport pipe is connected to a second pipe with the same or a different diameter. A second set of blades or a device that is designed to stop the rotation of the gas is arranged in the transition between the transport pipe and the second pipe so that the natural flow pattern of the gas/liquid becomes stratified over a predefined distance.

DETAILED DESCRIPTION OF THE INVENTION

The present invention will be described in further detail in the following by means of examples and with reference to the attached figures, which show a diagram of a transport pipe with a solution in accordance with the present invention.

Figure 1:
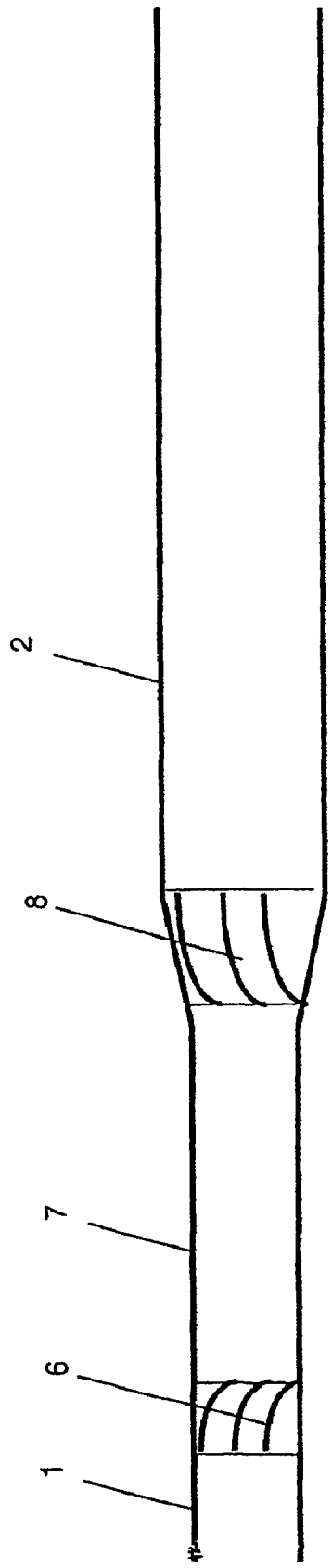
FIG. 1 is a schematic view of a transport pipe with a solution in accordance with the present invention.

As shown in FIG. 1, the special feature of the solution is that a set of stationary guide blades 6 is arranged in the pipe 1 for transport of liquid and gas. The guide blades are designed to rotate the dispersed liquid/gas flow. In turn, the transport pipe 1 is connected to a pipe 2 with a larger diameter. A second set of guide blades 8 or another suitable device that is designed to stop the rotation of the gas flow is arranged in the transition between the pipe 1 and the pipe 2 with a larger diameter.

The solution works as follows. Gas with a high gas/liquid ratio flows in the pipe 1 towards the guide blades 6. The guide blades cause the gas to rotate so that the drops are slung towards the pipe wall on account of centrifugal force, partially at the end of the blades 6 and in the area 7 of the pipe towards the second set of blades 8. A film of liquid is thus produced on the pipe in the area 7 with a flow direction towards the second set of blades 8. The gas is thus cleared of drops of liquid but will continue to rotate until it meets the blades 8, which have the opposite guide direction to the first set of blades 6. The rotation of the gas is stopped here, after which the liquid will flow towards the lower part of the pipe on account of gravitational force, while the gas will flow into the upper part of the pipe, thus establishing a stratified gas/liquid flow.

A decisive precondition for achieving stratified flow, however, is that the diameter of the pipe 2 is large enough to prevent redispersion being initiated and to ensure that the natural flow pattern remains stratified.

Moreover, the ratio between the diameter of the transport pipe 1 and the diameter of the pipe with a larger diameter 2, as well as the length of the guide blades and their angle to the pipe, will depend on the flow speed, the gas/liquid ratio, the viscosity of the liquid and the density of the liquid.

Figure 2:
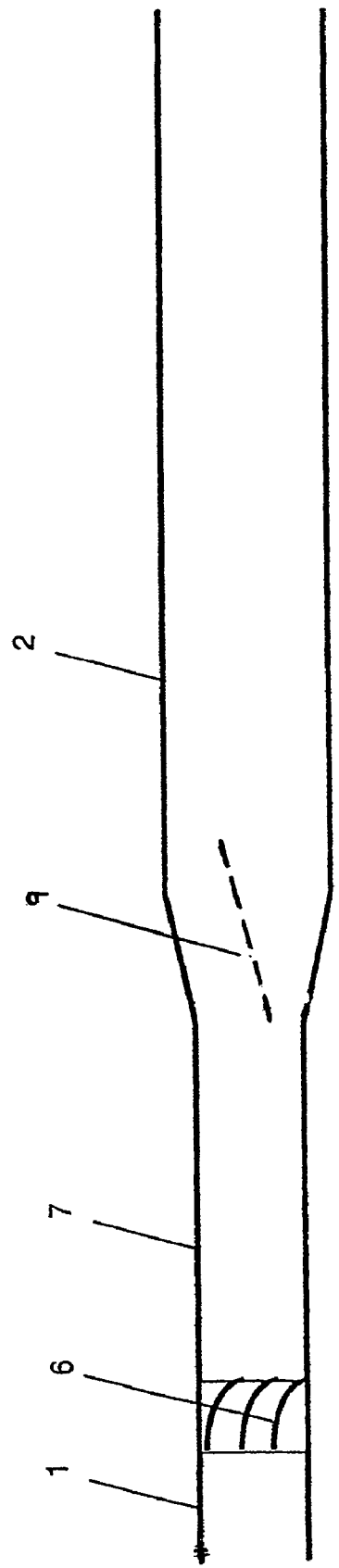
FIG. 2 is a schematic view of a transport pipe provided with a perforated plate rather than a second set of guide blades as in FIG. 1.

It should be noted that the present invention, as it is defined in the claims, is not limited to the embodiment shown in the attached drawing and described above. Therefore, instead of the second set of guide blades 8, it is possible to use another device that stops the gas rotation after the guide blades 6. A vertical or horizontal perforated plate arranged in the transition part between the transport pipe 1 and the pipe with the larger diameter 2 may be used. Moreover, as shown in FIG. 2, the perforated plate 9 may be arranged at an angle in relation to the longitudinal direction of the pipe with a direction that is the opposite of the guide direction of the blades 6.

Figure 3:
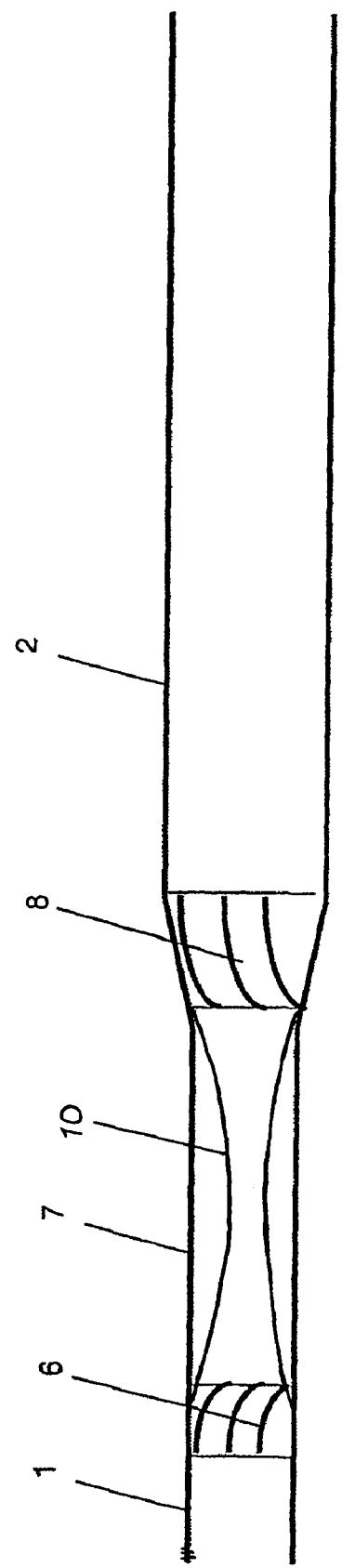
FIG. 3 is a schematic view of a transport pipe provided with a venturi.

Although the above description concerns a solution in which the second pipe has a larger diameter, it is also possible, in given flow situations, depending on the flow speed and drop density, to use solutions in which the second pipe has a larger or smaller diameter than the first pipe (the transport pipe). However, this requires, as stated above, that the flow speed of the gas after drop separation does not cause the liquid to be redispersed. Otherwise it will be possible to use a constriction in the pipe in the form of a venturi 10. As shown in FIG. 3, the first set of guide blades 6 should then be arranged at the inlet of the venturi so that they extend from a place in front of the inlet of the venturi and a little way into it.

The use of a venturi means that the speed is increased (through the venturi) so that a more intensive rotational field is established. The second set of blades 8 that stops the rotation is arranged at the outlet of the venturi, where the speed increases again. This results in equivalent liquid separation and stratified gas/liquid flow as in the example shown in the figure.

The invention claimed is:

1. A process for transforming a dispersed liquid/gas flow comprising liquid and gas into a stratified flow, wherein the process comprises:
    introducing the liquid/gas flow into a first pipe in which a set of stationary guide blades is arranged and which causes the liquid/gas flow to rotate;
    transmitting the liquid/gas flow to a second pipe connected to the first pipe, the second pipe having the same diameter or a different diameter than the first pipe; and
    stopping the rotation of the gas in the liquid/gas flow with a mechanism so that the flow pattern of the gas/liquid in the second pipe becomes stratified over a predefined distance and under the influence of a gravitation force, wherein the mechanism is a perforated plate that is located in a transition area between the first and second pipes.

2. A process in accordance with claim 1, wherein the second pipe has a larger diameter than the first pipe.

3. A process in accordance with claim 1, wherein a venturi is arranged in the first pipe, and the set of stationary guide blades is arranged at the inlet of the venturi, while the mechanism is arranged at the outlet of the venturi.

4. A process in accordance with claim 1, wherein the perforated plate is arranged at an angle in relation to the longitudinal direction of the first pipe.

5. A process in accordance with claim 1, wherein the first and second pipes are disposed in a horizontal orientation.

6. A process in accordance with claim 4, wherein the angle at which the perforated plate is arranged has a direction that is opposite to a guide direction of the set of stationary guide blades.

7. A process in accordance with claim 1, wherein the perforated plate is arranged in a vertical direction.

8. A process in accordance with claim 1, wherein the perforated plate is arranged in a horizontal direction.

* * * * *